(12) United States Patent
Bogner et al.

(10) Patent No.: US 9,856,783 B2
(45) Date of Patent: *Jan. 2, 2018

(54) EXHAUST-GAS TURBOCHARGER HAVING A WATER-COOLED TURBINE HOUSING WITH AN INTEGRATED ELECTRIC WASTEGATE ACTUATOR

(75) Inventors: Mathias Bogner, Neutraubling (DE); Ralf Böning, Reiffelbach (DE); Ralph-Maurice Kömpel, Mannheim (DE); Marc Hiller, Morschheim (DE); Roland Herfurth, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 656 days.

This patent is subject to a terminal disclaimer.

(21) Appl. No.: 13/977,361

(22) PCT Filed: Dec. 7, 2011

(86) PCT No.: PCT/EP2011/071995
§ 371 (c)(1), (2), (4) Date: Sep. 6, 2013

(87) PCT Pub. No.: WO2012/089459
PCT Pub. Date: Jul. 5, 2012

(65) Prior Publication Data
US 2013/0340426 A1    Dec. 26, 2013

(30) Foreign Application Priority Data
Dec. 28, 2010  (DE) .................. 10 2010 064 233

(51) Int. Cl.
*F02B 37/02*  (2006.01)
*F02B 37/00*  (2006.01)
(Continued)

(52) U.S. Cl.
CPC ............ *F02B 37/00* (2013.01); *F01D 17/105* (2013.01); *F01D 25/14* (2013.01); *F02B 37/186* (2013.01);
(Continued)

(58) Field of Classification Search
CPC ...... F02B 37/186; F02B 37/00; F02B 39/005; F01D 25/14; F01D 17/105; F04D 29/584;
(Continued)

(56) References Cited

U.S. PATENT DOCUMENTS 3,948,052 A    4/1976  Merkle et al.
4,075,849 A *  2/1978  Richardson ........... F02B 37/183
                                              60/602
(Continued)

FOREIGN PATENT DOCUMENTS

CN    101082318 A    12/2007
DE       2252705 A1     5/1974
(Continued)

OTHER PUBLICATIONS

Translation WO2010009945A2, May 30, 2015, entire document.*

*Primary Examiner* — Jason Shanske
*Assistant Examiner* — Jason T Newton
(74) *Attorney, Agent, or Firm* — Laurence A. Greenberg; Werner H. Stemer; Ralph E. Locher

(57) ABSTRACT

An exhaust-gas turbocharger includes a turbine housing and a wastegate which is disposed in the turbine housing. The turbine housing is water-cooled. An electric wastegate actuator is an integrated constituent part of the turbine housing.

9 Claims, 3 Drawing Sheets

(51) Int. Cl.
*F01D 17/10* (2006.01)
*F01D 25/14* (2006.01)
*F02B 37/18* (2006.01)
*F02B 39/00* (2006.01)

(52) U.S. Cl.
CPC ........ *F02B 39/005* (2013.01); *F05D 2220/40* (2013.01); *F05D 2260/20* (2013.01); *F05D 2260/232* (2013.01); *Y02T 10/144* (2013.01)

(58) Field of Classification Search
CPC .... F02C 6/12; F05D 2220/40; F05D 2260/20; F05D 2260/232; Y02T 10/144
USPC ......... 60/602, 605.3, 599; 417/406; 415/116
See application file for complete search history.

(56) References Cited

U.S. PATENT DOCUMENTS

| | | | |
|---|---|---|---|
| 5,148,678 | A | 9/1992 | Ueda et al. |
| 5,463,867 | A | 11/1995 | Ruetz |
| 6,405,535 | B1 | 6/2002 | McEwan |
| 6,435,169 | B1* | 8/2002 | Vogt .................. 123/568.23 |
| 7,448,212 | B2* | 11/2008 | Wood .................. 60/605.2 |
| 7,775,043 | B2 | 8/2010 | Funke et al. |
| 2003/0084887 | A1* | 5/2003 | Veinotte .................. 123/568.18 |
| 2003/0185672 | A1* | 10/2003 | Suganami ............ H02K 7/1166 415/150 |
| 2008/0298953 | A1* | 12/2008 | Harris .................. F02B 37/186 415/144 |
| 2010/0175377 | A1* | 7/2010 | Hippen et al. .................. 60/602 |
| 2012/0060494 | A1* | 3/2012 | Sato ...................... F02B 37/025 60/602 |
| 2012/0171059 | A1* | 7/2012 | Love ..................... F02B 37/186 417/410.1 |
| 2013/0011243 | A1* | 1/2013 | Alajbegovic ................. 415/144 |
| 2014/0154056 | A1* | 6/2014 | Ramb .................. F02B 37/186 415/148 |
| 2014/0271138 | A1* | 9/2014 | Markyvech ........... F01D 17/105 415/146 |
| 2017/0074158 | A1* | 3/2017 | Nowak ................. F02B 37/186 |
| 2017/0082016 | A1* | 3/2017 | Nowak ................. F02B 37/186 |
| 2017/0082017 | A1* | 3/2017 | Nowak ................. F02B 37/186 |

FOREIGN PATENT DOCUMENTS

| | | | | |
|---|---|---|---|---|
| DE | 2738929 | A1 | 3/1978 | |
| DE | 3009453 | A1 | 9/1981 | |
| DE | 3135107 | C2 | 3/1984 | |
| DE | 4040760 | A1 | 6/1991 | |
| DE | 4342572 | C1 | 11/1994 | |
| DE | 10200811257 | A1 | 9/2009 | |
| DE | 102008014609 | A1 | 9/2009 | |
| DE | 202009015888 | U1 * | 2/2010 | ............. F01D 17/10 |
| DE | 102008034680 | A1 | 6/2010 | |
| EP | 2372126 | A2 | 10/2011 | |
| FR | 2937109 | A1 | 4/2010 | |
| GB | 2083135 | A | 3/1982 | |
| WO | 2009115442 | A2 | 9/2009 | |
| WO | WO 2010009945 | A2 * | 1/2010 | ................ F02C 6/12 |
| WO | 2010043328 | A1 | 4/2010 | |

* cited by examiner

EXHAUST-GAS TURBOCHARGER HAVING A WATER-COOLED TURBINE HOUSING WITH AN INTEGRATED ELECTRIC WASTEGATE ACTUATOR

BACKGROUND OF THE INVENTION

Field of the Invention

The invention relates to an exhaust-gas turbocharger which is equipped with a so-called wastegate.

Exhaust-gas turbochargers serve for improving the efficiency of an internal combustion engine and thus increasing the power thereof. For this purpose, the exhaust-gas turbocharger has a turbine with a turbine wheel and a compressor with a compressor wheel, wherein the two rotor wheels are arranged on a common shaft. Here, the turbine wheel is driven by means of an exhaust-gas mass flow from a connected internal combustion engine, and in turn, drives the compressor wheel. The compressor compresses inducted fresh air and conducts said fresh air to the internal combustion engine. The common shaft is mounted in a bearing housing of the turbocharger. Furthermore, the turbine wheel of the turbine is arranged in a turbine housing, and the compressor wheel of the compressor is arranged in a compressor housing.

An exhaust-gas turbocharger of said type has to meet a wide variety of demands during operation on the internal combustion engine or on an engine connected thereto. One of said demands consists in absorbing the high temperatures that can arise for example owing to the hot exhaust-gas mass flow in the turbocharger housing.

Here, the conventional design of an exhaust-gas turbocharger provides individual housings which are composed in each case of a material adapted to the temperature prevailing therein. Here, the compressor housing is normally composed of aluminum, whereas the bearing housing is composed of cast iron, wherein the bearing housing may additionally be designed to be water-cooled. The turbine housing is generally composed, owing to the high temperatures that prevail in said region, of materials with a high nickel content. Owing to the adapted, different materials for the individual housings, said housings are formed as separate parts which are connected to one another, and which in the process must also be sealed off with respect one another.

The further the engine rotational speed increases, the faster is the rotation of the turbine wheel of the turbine, and with the latter the shaft of the exhaust-gas turbocharger on which the compressor wheel of the compressor is also situated, owing to the driving exhaust-gas flow. As a result of the faster rotation of the shaft and thus also of the compressor wheel, the air delivery rate of the compressor increases. This leads to an increasing exhaust-gas flow from the engine, which in turn leads to the turbine wheel being driven faster. So as not to exceed the respectively defined mechanical and thermal limits of the engine, regulation of the exhaust-gas turbocharger is necessary.

Such regulation of an exhaust-gas turbocharger may be realized using a wastegate, also referred to as a bypass valve. Such a wastegate has a flap which is connected to the turbine housing of the exhaust-gas turbocharger and which can be opened as required in order, as a function of the open position of a flap, to conduct a greater or lesser part of the hot exhaust gas past the turbine directly into the exhaust system of the vehicle. A further increase of the turbine rotational speed is thereby prevented.

Such a wastegate is subject to high thermal and mechanical loading owing to its position in the hot exhaust-gas flow.

It is already known for wastegate flaps to be adjusted using a pneumatic actuator. Such pneumatic actuators are often also referred to as pressure capsules.

In more recent applications, increasing efforts are now being made to replace the stated pneumatic actuators with electric actuators. Such an electric wastegate actuator offers advantages in relation to a pneumatic wastegate actuator. These advantages include a high actuation speed, good actuation accuracy and high actuation forces. Owing to said high actuation forces, fast closing of the wastegate flap in the associated flap seat is ensured. An electric wastegate actuator however also has disadvantages. These include an increased weight, an increased installation space requirement and self-heating. In particular, the thermal configuration of an electric wastegate actuator poses problems in practice. Temperatures of up to 140° C. prevail in the engine bay of a motor vehicle. Temperatures far higher than this may prevail in the direct vicinity of an exhaust-gas turbocharger. An electric wastegate actuator is additionally heated during the operation thereof by the current flowing through. A further problem that arises in practice is the positioning of the respective wastegate actuator.

In general, the wastegate forms a part of the turbine housing. The wastegate actuator or actuator is, by contrast, generally fastened to the compressor housing or to a bracket on the compressor housing. The bearing housing is arranged between the turbine housing and the compressor housing. Consequently, in the case of known exhaust-gas turbochargers, the wastegate actuator and the wastegate itself are connected to one another by a relatively long tolerance chain.

An electric wastegate actuator must be of correspondingly strong configuration such that it can impart the required actuation forces even when it itself is very hot, and it can withstand the occurring load cycles without overheating. Furthermore, during assembly, in a final assembly step, the summed tolerances must be compensated by means of a suitable compensation device in the coupling element or by means of a suitable assembly process of the coupling element. This is associated with considerable outlay and thus also with considerable costs.

BRIEF SUMMARY OF THE INVENTION

It is the object of the invention to specify an exhaust-gas turbocharger in which said long tolerance chain is eliminated.

Said object is achieved by means of an exhaust-gas turbocharger having a turbine housing and a wastegate disposed in the turbine housing. The turbine housing is water-cooled and an electric wastegate actuator is an integrated constituent part of the turbine housing. The dependent claims specify advantageous embodiments and refinements of the invention.

The advantages of the invention consist in particular in that, as a result of the integration of an electric wastegate actuator into the water-cooled turbine housing of an exhaust-gas turbocharger, the above-mentioned long tolerance chain is eliminated. In the case of known exhaust-gas turbochargers, owing to the high temperatures prevailing therein, an integration of any actuator into a turbine housing was inconceivable. As a result of the water cooling of the turbine housing, it is possible for an electric wastegate actuator to be arranged in the turbine housing because, as a result of the thermal connection to the water jacket of the turbine housing, heat which is generated can be dissipated more effectively than in the case of the electric wastegate actuator being arranged freely in the exhaust-gas flow or integrated into the compressor housing.

Further advantageous characteristics of the invention will emerge from the following exemplary explanation on the basis of the figures.

DESCRIPTION OF THE INVENTION

A description will be given below of an exhaust-gas turbocharger which has a turbine housing and which is equipped with a wastegate which is arranged in the turbine housing, the turbine housing being water-cooled and an electric wastegate actuator being an integrated constituent part of the turbine housing.

Figure 1:
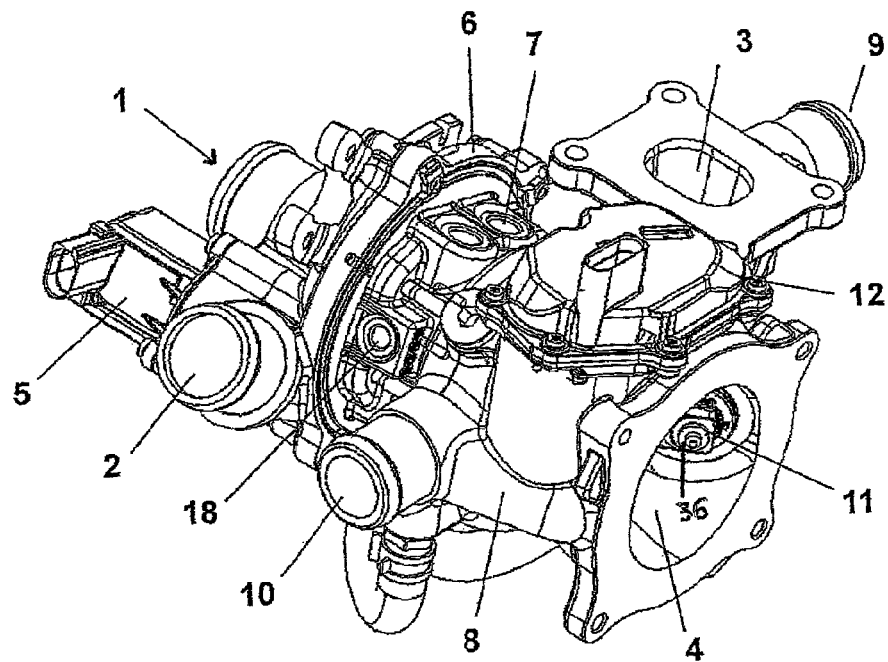
FIG. 1 is a perspective sketch of an exhaust-gas turbocharger with a water-cooled turbine housing and an integrated wastegate actuator.

FIG. 1 is a perspective sketch illustrating an exhaust-gas turbocharger which has a water-cooled turbine housing in which an electric wastegate actuator is integrated. Said illustration shows the major components and connectors of the exhaust-gas turbocharger The illustrated exhaust-gas turbocharger has a compressor housing 6, a bearing housing 7 and a water-cooled turbine housing 8.

In the compressor housing 6, in the conventional manner, a compressor wheel is arranged on a common shaft. In the turbine housing 8, in a conventional manner, a turbine wheel is arranged on the common shaft. The common shaft is mounted in the bearing housing 7, which is positioned between the compressor housing 6 and the turbine housing 8. During the operation of the exhaust-gas turbocharger, the turbine wheel is driven by an exhaust-gas mass flow from a connected internal combustion engine, and in turn drives the compressor wheel via the common shaft. The compressor compresses inducted fresh air and conducts said fresh air to the internal combustion engine. The compressor housing 6 has a fresh-air inlet 1, through which fresh air from the environment is inducted into the exhaust-gas turbocharger, and a fresh air outlet 2, through which compressed fresh air is discharged in order to be conducted to the internal combustion engine. Furthermore, the compressor housing 6 is provided with an overrun air recirculation valve 5. Said overrun air recirculation valve has the task, during operation of the exhaust-gas turbocharger, of opening a bypass past the compressor in the event of a negative load step, such that excess charge pressure can be blown off.

The bearing housing 7 has an oil inlet 18 and an oil outlet (not illustrated in the figure). Oil which is used for the lubrication of the common shaft enters through the oil inlet 18 during the operation of the exhaust-gas turbocharger.

The turbine housing 8 is provided with a water inlet 9 and a water outlet 10. During the operation of the exhaust-gas turbocharger, cooling water enters through the water inlet 9, which cooling water is conducted through cooling water ducts running in the interior of the turbine housing 8 and exits the turbine housing again through the water outlet 10. Said cooling water cools the turbine housing 8 which, owing to its positioning in the hot exhaust-gas flow, is subject to high temperatures during the operation of the exhaust-gas turbocharger.

Furthermore, the turbine housing 8 is provided with an exhaust-gas inlet 3 and an exhaust-gas outlet 4. The exhaust-gas inlet 3 is connected to an exhaust-gas exit of the internal combustion engine, such that the hot exhaust gas of the internal combustion engine passes through the exhaust-gas inlet 3 into the interior region of the turbine housing 8. There, the hot exhaust gas drives the turbine wheel arranged in the turbine housing, which turbine wheel in turn, via the common shaft, drives the compressor wheel arranged in the compressor housing. The exhaust gas exits the turbine housing 8 again through the exhaust-gas outlet 4, which is connected to the catalytic converter of the motor vehicle.

To regulate the power of the turbine wheel, a wastegate 11 is integrated into the turbine housing 4. Said wastegate 11 has a flap 36 which, by means of an electric wastegate actuator 12 integrated into the turbine housing, can be opened to a greater or lesser extent in accordance with the present demand in order to conduct a desired proportion of the hot exhaust gas past the turbine wheel and directly to the exhaust-gas outlet 4.

Both the stated electric wastegate actuator 12 and also the coupling element coupling the same to the flap 36 of the wastegate 11 are thermally coupled to the cooling water ducts of the turbine housing, such that said components are also cooled by the cooling water.

As a result of the integration of the electric wastegate actuator 12 into the turbine housing 8, the long tolerance chain present in known exhaust-gas turbochargers is shortened considerably. In this way, the need for providing suitable compensating devices in the coupling element, or for performing a suitable assembly process for the coupling element for the purpose of compensating summed tolerances, is eliminated. This reduces the outlay required for the assembly of the exhaust-gas turbocharger, and thus also the costs thereof.

Figure 2:
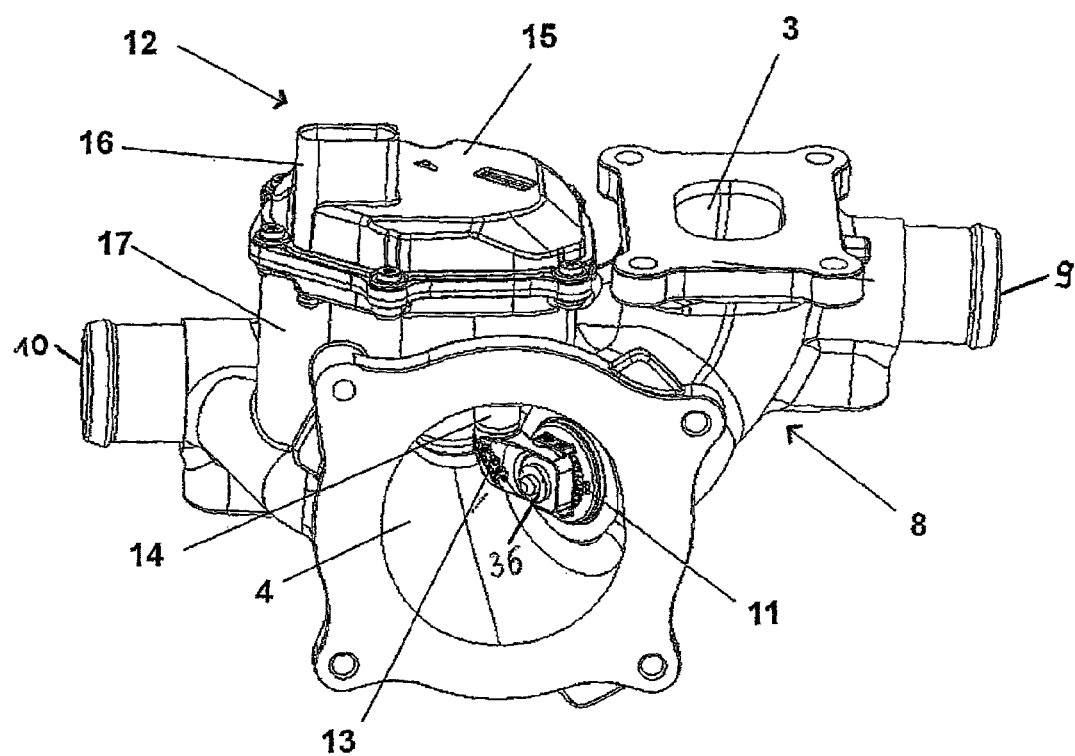
FIG. 2 is a sketch of the turbine housing as an assembly of the exhaust-gas turbocharger shown in FIG. 1.

FIG. 2 shows a sketch of the turbine housing 8 as an assembly of the exhaust-gas turbocharger shown in FIG. 1. From said FIG. 2, it can be seen in particular that the wastegate 11 has a wastegate spindle 13 to which the wastegate flap 36 is fastened. Said wastegate spindle 13 is rotatably mounted in a wastegate bushing 14. The electric wastegate actuator 12 is integrated into the water-cooled turbine housing 8 and has a cover 15 in which a plug 16 is integrated. The cover 15 is fastened to a receptacle for the gear stages and a motor slot 17, wherein the motor slot is provided for accommodating an electric motor.

Furthermore, the water inlet 9, the water outlet 10, the exhaust-gas inlet 3 an exhaust-gas outlet 4 are illustrated in FIG. 2.

Figure 3:
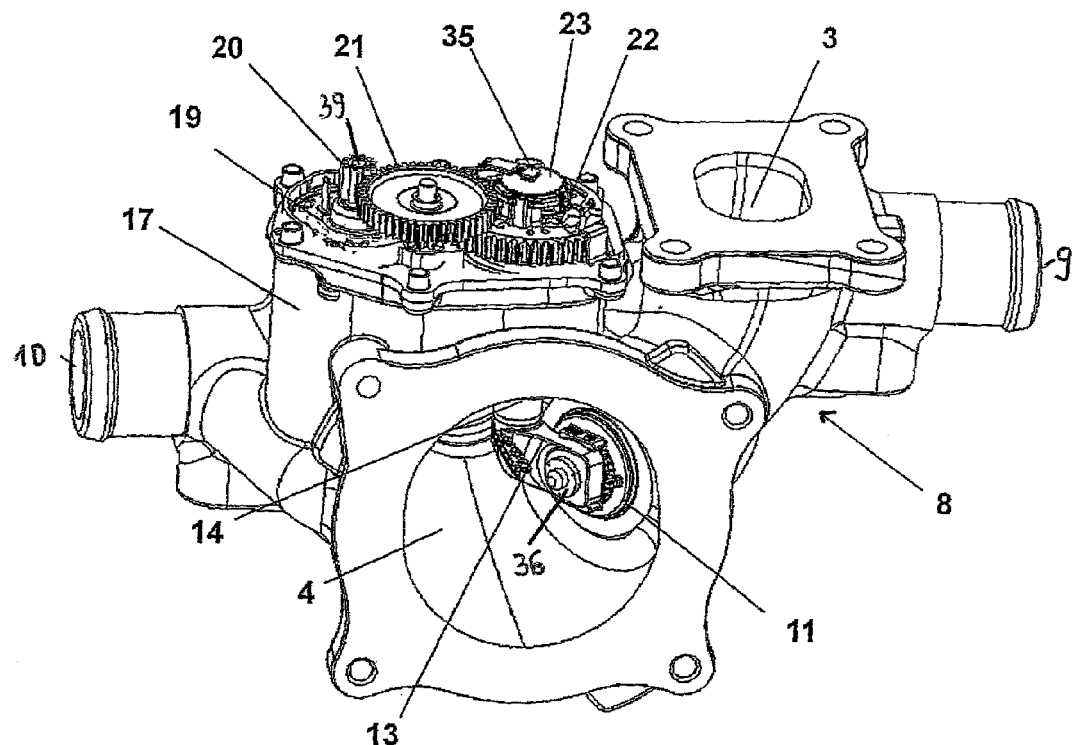
FIG. 3 is a sketch of the turbine housing as an assembly of the exhaust-gas turbocharger shown in FIG. 1, without a cover.

FIG. 3 shows a sketch of the turbine housing 8 as an assembly of the exhaust-gas turbocharger shown in FIG. 1, wherein by contrast to FIG. 2, however, the cover 16 has been removed.

It can be seen from FIG. 3 that the electric wastegate actuator 12 has an electric motor 19 which comprises a drive output gearwheel 20, the latter being attached to a drive output shaft 39 of the electric motor 19. Said electric motor 19 is inserted into the motor slot 17 which forms, for said electric motor, a receptacle provided in the water-cooled turbine housing. The torque provided by the drive output gearwheel 20 is transmitted to an intermediate gearwheel 21. The latter in turn transmits the rotational movement to a drive output gearwheel 22 which is arranged on the drive output shaft 34 (see FIG. 5) of the electric wastegate actuator 12. To said drive output gearwheel 22 there is fastened a magnet 23 by means of which a sensor 35 can determine the angular position of the drive output shaft 34.

In the exemplary embodiment shown in FIG. 3 there is illustrated a gearing having two gear stages. In further exemplary embodiments which are not illustrated in the figures, an electric wastegate actuator integrated into a water-cooled turbine housing may also have some other number of gear stages, for example one gear stage, three gear stages, four gear stages or even more gear stages.

Figure 4:
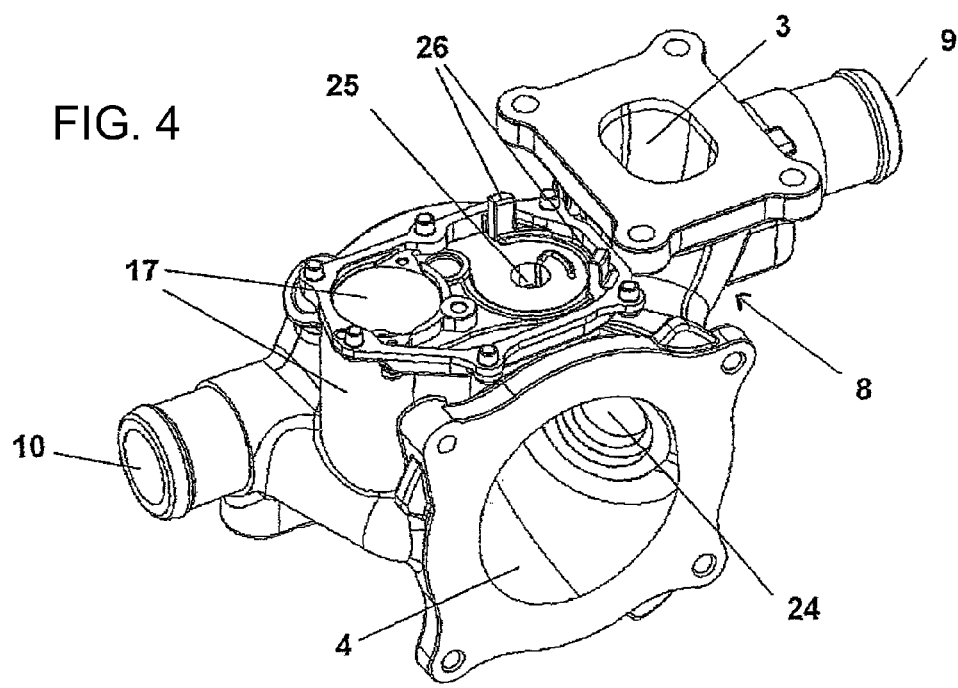
FIG. 4 is a sketch of a machined finished part of the turbine housing with a receptacle for an electric wastegate actuator.

FIG. 4 shows a sketch of a machined finished part of the turbine housing 8 with a receptacle for an integrated electric wastegate actuator. Said illustration shows the wastegate duct 24 through which the hot exhaust gases of the internal combustion engine are conducted past the turbine wheel. Furthermore, FIG. 4 illustrates the motor slot 17 which is provided for accommodating the electric motor of the electric wastegate actuator. Also shown in FIG. 4 is a slot or duct 25 which is provided for accommodating the drive output shaft 34 of the electric wastegate actuator. Also shown in FIG. 4 are the end stops 26 which serve for limiting the angle of rotation of the drive output gearwheel 22 of the wastegate actuator.

Figure 5:
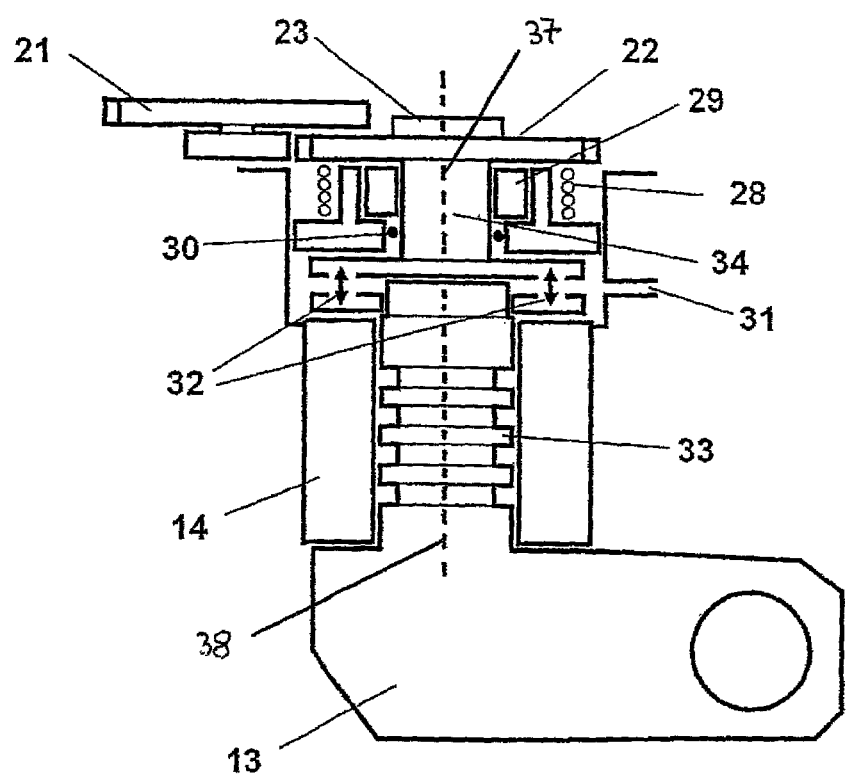
FIG. 5 is a sectional illustration showing the mounting of a wastegate spindle in a wastegate bushing.

FIG. 5 is a sectional illustration showing, in more detail, the mounting of the wastegate spindle 13 shown in FIG. 3 in the wastegate bushing 14. To attain expedient packaging and low system complexity and to permit desired cooling effects, the drive output shaft 34 of the electric wastegate actuator and the shaft of the wastegate spindle 13 lie on a common axis, that is to say their central lines 37 and 38 run in alignment. In the case of such an arrangement of the electric wastegate actuator, the lower end region of the wastegate spindle 13 in FIG. 5 is situated, during operation, in the very hot exhaust-gas flow of the motor vehicle. Situated in the upper end region of the arrangement shown in FIG. 5 is the magnet 23 which, together with the sensor 35 shown in FIG. 3, serves for detecting the angular position of the drive output shaft 34 of the electric wastegate actuator 12. Also shown in FIG. 5 are the intermediate gearwheel 21 and the gearwheel 22 which is connected to the drive output shaft 34.

To ensure that, during operation, neither the magnet 23 nor the sensor 35 nor the electric motor 19 of the electric wastegate actuator 12 are subject to high temperatures, the wastegate spindle 13 has cooling fins 33. Furthermore, the drive output shaft 34 of the electric wastegate actuator 12 is thermally decoupled from the wastegate spindle 13. In this way, the heat flow from the wastegate spindle 13 to the electric wastegate actuator 12 is advantageously kept low. Said thermal decoupling is realized in the exemplary embodiment shown in that the wastegate spindle 13 and the drive output shaft 34 of the electric wastegate actuator are two different components which are coupled to one another merely by means of a positively locking connection 32. The drive output shaft 34 is rotatably mounted by means of a bearing arrangement 29. Said bearing arrangement is a ball bearing, a needle-roller bearing, a roller bearing, etc. The stated cooling effect is furthermore contributed to by the thermal coupling, already mentioned above, of the wastegate and of one or more components of the wastegate actuator to one or more cooling ducts of the turbine housing.

To prevent exhaust gases from being able to ingress in an undesired manner into the interior of the electric wastegate actuator, a seal 30 is provided.

Furthermore, the device shown in FIG. 5 has a vent 31. This has the advantage that any small amount of exhaust gas that may be encountered can escape to the outside and cannot be forced past the seal 30 into the interior of the electric wastegate actuator. Around the drive output shaft 34 there is provided a rotary spring 28, such that a preferential direction of movement is assisted.

The invention claimed is:

1. An exhaust-gas turbocharger, comprising:
a water-cooled turbine housing;
a wastegate disposed in said turbine housing, said wastegate having a wastegate spindle with a shaft and a wastegate flap fastened to said wastegate spindle;
an electric wastegate actuator being an integrated constituent part of said turbine housing, said electric wastegate actuator having an electric motor;
said turbine housing having a motor slot for accommodating said electric motor;
said electric motor mounted in said motor slot and having a drive output gearwheel;
said wastegate actuator having a drive output shaft, an intermediate gearwheel and a further drive output gearwheel disposed on said drive output shaft;
said drive output gear wheel of said electric motor acting through said intermediate gearwheel on said further drive output gearwheel; and
said drive output shaft of said electric wastegate actuator and said shaft of said wastegate spindle lying on a common axis.

2. The exhaust-gas turbocharger according to claim 1, wherein said turbine housing has a water inlet, a water outlet and cooling ducts.

3. The exhaust-gas turbocharger according to claim 1, which further comprises a wastegate bushing on which said wastegate spindle is rotatably mounted.

4. The exhaust-gas turbocharger according to claim 1, wherein said wastegate actuator has a cover and a plug integrated in said cover.

5. The exhaust-gas turbocharger according to claim 4, wherein said cover is fastened to a receptacle for gear stages and is associated with a motor slot.

6. The exhaust-gas turbocharger according to claim 1, which further comprises a sensor, and a magnet fastened to said further drive output gearwheel and interacting with said sensor for detecting an angular position of said drive output shaft of said electric wastegate actuator.

7. The exhaust-gas turbocharger according to claim 1, wherein said wastegate spindle has cooling fins.

8. The exhaust-gas turbocharger according to claim 1, wherein said wastegate spindle is thermally decoupled from said drive output shaft of said electric wastegate actuator.

9. The exhaust-gas turbocharger according to claim 8, wherein said wastegate spindle and said drive output shaft of said electric wastegate actuator are two different components coupled to one another by a form-locking connection.

* * * * *